(12) United States Patent
Lee

(10) Patent No.: US 9,938,404 B2
(45) Date of Patent: Apr. 10, 2018

(54) RESIN COMPOSITION FOR COATING PLASTIC GLAZING, PLASTIC GLAZING COATED WITH THE SAME, AND METHOD OF MANUFACTURING PLASTIC GLAZING

(71) Applicant: Hyundai Motor Company, Seoul (KR)

(72) Inventor: Yong Beom Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 154 days.

(21) Appl. No.: 15/199,551

(22) Filed: Jun. 30, 2016

(65) Prior Publication Data

US 2017/0166739 A1  Jun. 15, 2017

(30) Foreign Application Priority Data

Dec. 10, 2015  (KR) .................. 10-2015-0176314

(51) Int. Cl.
| | |
|---|---|
| *C08G 63/02* | (2006.01) |
| *C08L 33/12* | (2006.01) |
| *B29C 47/02* | (2006.01) |
| *C08J 5/18* | (2006.01) |
| *B32B 27/08* | (2006.01) |
| *B29C 45/00* | (2006.01) |
| *B29C 45/14* | (2006.01) |
| *B29C 47/00* | (2006.01) |
| *B29K 33/00* | (2006.01) |
| *B29K 69/00* | (2006.01) |
| *B29K 669/00* | (2006.01) |
| *B29L 31/30* | (2006.01) |

(52) U.S. Cl.
CPC ............ *C08L 33/12* (2013.01); *B29C 47/025* (2013.01); *B32B 27/08* (2013.01); *C08J 5/18* (2013.01); *B29C 45/0001* (2013.01); *B29C 45/14434* (2013.01); *B29C 45/14778* (2013.01); *B29C 47/0007* (2013.01); *B29K 2033/12* (2013.01); *B29K 2069/00* (2013.01); *B29K 2669/00* (2013.01); *B29L 2031/3052* (2013.01); *C08J 2333/12* (2013.01); *C08J 2469/00* (2013.01); *C08J 2483/04* (2013.01)

(58) Field of Classification Search
USPC ... 428/500, 34, 38, 213, 216, 412, 426, 432, 428/433, 434
See application file for complete search history.

(56) References Cited

U.S. PATENT DOCUMENTS 6,960,623 B2  11/2005  Gorny et al.

FOREIGN PATENT DOCUMENTS

| JP | 2004-534667 A | 11/2004 |
|---|---|---|
| JP | 2009-221386 A | 10/2009 |
| KR | 10-2006-0050497 A | 5/2006 |
| KR | 10-2007-0058076 A | 6/2007 |
| KR | 10-0738462 B1 | 7/2007 |
| KR | 10-2010-0069889 A | 6/2010 |
| KR | 10-1352534 B1 | 1/2014 |
| WO | 02/47908 A1 | 6/2002 |

*Primary Examiner* — Terressa Boykin
(74) *Attorney, Agent, or Firm* — Mintz Levin Cohn Ferris Glovsky and Popeo, P.C.; Peter F. Corless

(57) ABSTRACT

Disclosed are a resin composition for coating a plastic glazing to provide superior scratch resistance and weather resistance and satisfactory compatibility with polycarbonate glass, and a plastic glazing coated with the same. In particular, the resin composition may be suitable for a glazing, for example, a panorama sunroof of a vehicle and the like. In addition, disclosed is a method of economically manufacturing the plastic glazing and the method comprises integrally molding a substrate comprising the resin composition of the present invention, polycarbonate and the like through double injection or double extrusion.

15 Claims, No Drawings

RESIN COMPOSITION FOR COATING PLASTIC GLAZING, PLASTIC GLAZING COATED WITH THE SAME, AND METHOD OF MANUFACTURING PLASTIC GLAZING

CROSS-REFERENCE TO RELATED APPLICATION

This application claims under 35 U.S.C. § 119(a) the benefit of priority to Korean Patent Application No. 10-2015-0176314 filed on Dec. 10, 2015, the entire contents of which are incorporated herein by reference.

BACKGROUND (a) Technical Field

The present invention relates to a resin composition for coating a plastic glazing that may provide substantially improved scratch resistance and weather resistance and satisfactory compatibility with polycarbonate glass, and a plastic glazing coated with the same.

In addition, the present invention relates to a method of manufacturing the plastic glazing using the resin composition.

(b) Background Art

The vehicle industry has faced a cutthroat competition. Accordingly, each vehicle manufacturer has concentrated on research into securing competitiveness through reducing weight of vehicles, differentiated designs of vehicles, production cost reduction, and the like.

Among those endeavors, a method of applying transparent plastic, instead of glass has been used to glazing components of vehicles. Glass is difficult to be handled due to the weight thereof and does not have an impact resistant. In addition, since glass has low tensile strength, resistance thereof to bending moment is low, thereby being easily broken. Although a tempered glass has been made, it is still difficult to realize weight-reduction of such tempered glass.

Accordingly, research has been actively conducted to use an engineering plastic such as polycarbonate, which has improved strength and high light transmissivity, particularly as being used in glazing of vehicles. In particular, the polycarbonate provides many advantages such as weight reduction, a fuel efficiency increase, and various designs available according to shape modification.

For example, Korean Patent No. 10-1352534 has disclosed a technology of injection-compression-molding a transparent plastic substrate composed of polycarbonate resin and using the same as plastic for automobile glass.

However, since a surface of plastic resin such as polycarbonate may easily crack or be scratched or cracked, surface-treated may be required to compensate for durability such as weather resistance, and scratch resistance.

In addition, Korean Patent No. 10-0738462 has reported a polycarbonate resin surface treatment technology, wherein the resin surface is coated with a polymethylmethacrylate film and a scratch-resistant film.

However, such a method of repeating coating (spreading) and drying may not be suitable for mass production due to complex process conditions and steps thereof. In addition, working time of the method may be extended, and thus, a cost from components may increase.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a resin composition for coating a plastic glazing with substantially improved durability, e.g., excellent weather resistance and scratch resistance, and a plastic glazing coated with the resin composition. In addition, the present invention to provide a method of manufacturing a plastic glazing to increase productivity and reduce production costs using the resin composition.

Objects of the present invention are not limited to the aforementioned objects. The objects will be more clarified through the following descriptions and accomplished through means disclosed in the following claims and combinations thereof.

The present invention may include the following configurations to accomplish the aforementioned objects.

In one aspect, provided is a resin composition for coating a plastic glazing. The resin composition may comprise an amount of about 60 to 70% by weight of polymethylmethacrylate resin, an amount of about 20 to 30% by weight of polycarbonate resin copolymerized with polydimethylsiloxane, and an amount of about 5 to 10% by weight of compatibilizer. All the % by weights as used herein are based on the total weight of the resin composition, unless otherwise indicated herein.

The polymethylmethacrylate resin may have a refractive index of about 1.45 to 1.55 and a liquidity of about 5 to 7 g/10 min as being measured at a temperature of 230° C. and at a gravity force of 3.8 kgf.

The polycarbonate resin copolymerized with polydimethylsiloxane may have a refractive index of about 1.54 to 1.64 and a liquidity of about 6 to 10 g/10 min as being measured at a temperature of 300° C. and at a gravity force of 1.2 kgf.

The compatibilizer may be one or more selected from the group consisting of divinylbenzene, ethylene glycol dimethacrylate, and diethylene glycol dimethacrylate.

The resin composition according to present invention may further comprise an amount of about 0.2 to 1.0 parts by weight of slip agent, based on 100 parts by weight of the resin composition. In particular, the slip agent may be at least one fatty acid amide selected from the group consisting of erucamide, behenamide, stearamide, oleamide, and palmitamide.

The resin composition according to present invention may further comprise an amount of about 0.1 to 1.0 parts by weight of at least one UV stabilizer based on 100 parts by weight of the resin composition. The UV stabilizer may be selected from benzotriazole-based UV stabilizers, benzophenone-based UV stabilizers, hindered amine light stabilizers (HALSs), and triazine-based UV stabilizers.

The resin composition according to the present invention may further comprise at least one additive selected from a filler, a reinforcing agent, a coloring agent, a lubricant, a stabilizer, an antioxidant, and a heat-resistant agent.

Further provided is a plastic glazing that may be coated with the resin composition. The plastic glazing may be a sunroof, a panorama sunroof, a rear glass, a front glass, or a quarter glass of a vehicle.

The term "glazing" as used herein refers to a wall, panel, window, or a portion thereof which may be formed of a glass or a substantially transparent material such as reinforced polymers. The glazing of the present invention may be particularly made for a vehicle use.

Still provided is a vehicle that may comprise the plastic glazing coated with the resin composition as described herein. Alternatively, the present invention provides a vehicle that may comprise the resin composition as described herein.

In another aspect, the present invention provides a method of manufacturing the plastic glazing. The method may comprise integrally molding the plastic glazing by double-injecting or double-extruding the resin composition and polycarbonate glass.

Preferably, the double injecting or the double extruding may be performed at a molding temperature of about 190 to 220° C. for a molding time of about 100 to 200 sec.

Other aspects of the invention are discussed infra.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the description of the present invention, descriptions of known configurations and functions are omitted when it is deemed that they may unnecessarily obscure the essence of the invention.

A resin composition for coating a plastic glazing (hereinafter referred to as "resin composition for coating") according to the present invention may include polymethylmethacrylate (PMMA) resin, polycarbonate (PC) resin copolymerized with polydimethylsiloxane (PDMS), and a compatibilizer.

Conventional plastic glazing has been manufactured by two-layer-coating a polycarbonate substrate (hereinafter referred to as "'PC substrate"), or the like which has been used instead of glass, to increase weather resistance, scratch resistance and the like.

On the other hand, the plastic glazing of the present invention may be manufactured by double injecting or double-extruding the resin composition on the PC substrate. Detailed descriptions for this method are following.

The PMMA resin may be suitably used as a base resin of the coating composition according to an exemplary embodiment of the present invention due to its satisfactory impact resistance and liquidity.

Since the resin composition is applied to a plastic glazing, transparency of the resin composition may be secured and the resin composition may be required to be easily molded through double injection or double extrusion.

The term "transparent" material or "transparent" resin, as used herein, may refer to a material having substantial transmittance of a fraction of light, such as visible light, to naked eyes. For instance, substantial amount of visible light such as of about 50%, about 60%, about 70%, about 80%, about 90%, about 95%, about 99%, or greater thereof may transmit or pass through the transparent material or resin.

Preferably, the PMMA resin may have a refractive index of about 1.45 to 1.55, and a liquidity of about 5 to 7 g/10 min as being measured at a temperature of 230° C. and at a gravity force of 3.8 kgf. When the refractive index of the PMMA resin is within this range, the PMMA resin may have the refractive index similar to that of the PC substrate (e.g. of about 1.60), thereby increasing transparency. In addition, when the liquidity of the PMMA resin is within the range, molding through double injection or double extrusion may be suitably performed.

The resin composition may include an amount of about 60 to 70% by weight of the PMMA resin based on the total weight of the resin composition. When the amount of the PMMA resin is of about 60% by weight or greater, weather resistance and scratch resistance (abrasion resistance) may be increased. When the amount of the PMMA resin is 70% by weight or less, superior impact resistance and moldability may be secured.

The PMMA resin may be used as a mixture of a methylmethacrylate-based copolymer so as to further provide other properties such as moisture resistance, water resistance and heat-resistance.

The copolymer may be a copolymer of a methylmethacrylate monomer and at least one monomer may be selected from the group consisting of methylacrylate, ethylmethacrylate, butylmethacrylate, styrene, acrylonitrile, and dimethylsiloxane.

Preferably, the copolymer may be included in an amount of about 15 to 30% by weight based on the total weight of the PMMA resin. When the content of the copolymer is within this range, desired properties may be increased without deterioration of unique properties, such as weather resistance and scratch resistance, of the PMMA resin.

A PC resin copolymerized with the PDMS (hereinafter referred to as "PDMS-PC" resin) may increase compatibility with the PC substrate during double injection or double extrusion and enhances heat-resistance and impact resistance.

In addition, since the PDMS-PC resin has satisfactory weather resistance unlike conventional PC resins, discoloration of the resin such as yellowing may not occur. To increase weather resistance, the PDMS may be included in an amount of about 0.3 to 21% by weight based on the total weight of the PDMS-PC resin.

The PDMS-PC resin may also affect transparency and moldability of the resin composition like the PMMA resin. Therefore, the PDMS-PC resin may have a refractive index of about 1.54 to 1.64 and a liquidity of about 6 to 10 g/10 min as being measured at a temperature of 230° C. and at a gravity force of 1.2 kgf. When the refractive index of the PDMS-PC resin is within the range, the refractive index of the PDMS-PC resin may be similar to that (1.60) of the PC substrate, thereby increasing transparency. In addition, when the liquidity of the PDMS-PC resin is within the range, molding using double injection or double extrusion may be suitably performed.

The resin composition may include an amount of about 20 to 30% by weight of the PDMS-PC resin. When the amount of the PDMS-PC resin is less than about 20% by weight, compatibility with the PC substrate, impact resistance, and heat-resistance may not be sufficiently improved. In addition, when the amount of the PDMS-PC resin is greater than about 30% by weight, the content of the PMMA resin may be decreased, thereby decreasing weather resistance and scratch resistance (abrasion resistance).

The compatibilizer may be provided to uniformly mix the PMMA resin and the PDMS-PC resin.

The compatibilizer may be one or more selected from the group consisting of divinylbenzene, ethylene glycol dimethacrylate, and diethylene glycol dimethacrylate.

The resin composition may include an amount of about 5 to 10% by weight of the compatibilizer based on the total weight of the resin composition. When the amount of the compatibilizer is less than about 5% by weight, compatibility between constituents of the resin composition may be decreased, thereby generating problems such as phase separation, etc. When the amount of the compatibilizer is greater than about 10% by weight, mechanical properties such as hardness and strength may be reduced.

The resin composition may further include a slip agent. The slip agent may be provided to further increase scratch resistance.

The slip agent may be a fatty acid amide. Preferably, the slip agent may be at least one fatty acid amide selected from the group consisting of erucamide, behenamide, stearamide, oleamide, and palmitamide.

The slip agent may be used in an amount of about 0.2 to 1.0 parts by weight based on 100 parts by weight of the resin composition. When the amount of the slip agent is less than about 0.2 parts by weight, effects due to addition of the slip agent may not be sufficient. When the amount of the slip agent is greater than about 1.0 part by weight, increased effect with respect to the added amount may not be obtained substantially, thereby losing economical advantage.

The resin composition may further include a UV stabilizer. The UV stabilizer may be provided to prevent aging of a resin composition and a plastic glazing caused by UV sunlight.

The UV stabilizer may be at least one UV stabilizer selected from the group consisting of benzotriazole-based UV stabilizers, benzophenone-based UV stabilizers, hindered amine light stabilizers (HALSs), and triazine-based UV stabilizers. In addition, a mixture of two or more selected from the UV stabilizers may be suitably used to stably protect the resin composition from UV light.

The UV stabilizer may be included in an amount of about 0.1 to 1.0 parts by weight based on 100 parts by weight of the resin composition. When the UV stabilizer is used in an amount of less than about 0.2 parts by weight, effects due to addition of the UV stabilizer may not be sufficient. When the UV stabilizer is used in an amount of greater than about 1.0 part by weight, increased effect with respect to the addition amount thereof may not be substantial, thereby losing economical advantage.

The resin composition may further include one or more additives selected from a filler, a reinforcing agent, a coloring agent, a lubricant, a stabilizer, an antioxidant, a heat-resistant agent, and the like.

Hereinafter, a method of preparing the resin composition and a method of manufacturing a plastic glazing using the same are described in detail. The aforementioned descriptions for each configuration of the resin composition are omitted to avoid overlapping.

The resin composition may be prepared by mixing the PMMA resin, the PDMS-PC resin, the compatibilizer, the slip agent, the UV stabilizer, and the additives. The mixing method or order may not be particularly limited to a specific method. Preferably, the constituents may be mixed by means of a mixer such as a Henschel mixer, a ball mill, or a tumbler mixer and then melt-mixed by means of a melt-extruder. Particularly, melting temperature may be controlled at a temperature ranging from about 180 to about 250° C.

After the resin components are melt-mixed as described above, a resultant product may be dried to complete the resin composition. The drying process may be performed at a temperature of about 50 to 80° C. for about three to five hours. When the drying is performed at a temperature less than about 50° C. or for less than about three hours, sufficient drying may not be performed. When the drying is performed at a temperature greater than about 80° C. or for greater than five hours, excessive drying occurs, the shape of the resin composition may be deformed.

Subsequently, the resin composition completed as described above and the PC substrate may be inserted into a mold together, followed by double injecting or double extruding to integrally mold a plastic glazing at once. Here, the molding process may be performed at a molding temperature of about 190 to 220° C. for a molding time of about 100 to 200 sec, and at a speed of about 100 to 200 rpm.

As described above, the method of manufacturing a plastic glazing according to the present invention has a characteristic in that it is very simple, compared to a conventional coating-drying-coating-drying method (for example, two-layer hard coating method). While the conventional method requires drying for about two hours after coating, the manufacturing method according to the present invention may be completed within only about 100 to 200 sec, thereby remarkably increasing productivity.

In addition, since existing manufacturing devices of injecting or extruding of a PC substrate may be used as the manufacturing method according the present invention, a separate system is not required to perform hard-coating. Therefore, cost competitiveness of products may be increased.

EXAMPLE

Hereinafter, the present invention will be described in more detail with reference to the following Examples. The scope of the present invention is not limited to the following Examples and covers modifications of the technical spirit substantially equivalent thereto.

Examples and Comparative Examples

Resin compositions were prepared using compositions and contents summarized in Table 1 below. In addition, each of the resin compositions was double-injected on a PC substrate to complete a plastic glazing.

C.×3 h→1 h at room temperature →50±2° C., 95±2% RH×7 h→1 h at room temperature. Subsequently, when a surface of a coating film did not show discoloration, fading, swelling, cracks, gloss decrease, and the like, it was evaluated to be satisfactory. Otherwise, it was evaluated to be unsatisfactory.

Heat-resistance was evaluated under a condition of a test temperature 80±2° C. and a test time of 300 hr. When a surface of a coating film did not show discoloration, fading,

TABLE 1

| | Evaluation results | | | | | | | | | | |
|---|---|---|---|---|---|---|---|---|---|---|---|
| | Durability | | | | | | | | Weather | Taber | |
| Classification | Impact resistance | Moisture resistance | Water resistance | Thermal cycle | Heat resistance | Acid resistance | Alkali resistance | Chemical resistance | resistance [ΔE: 3.0 ↓] | abrasion test | Refractive index |
| Example 1 | Satisfied | Satisfied | Satisfied | Satisfied | Satisfied | Satisfied | Satisfied | Satisfied | 1.95 | 9.4% | 1.60 |
| Example 2 | Satisfied | Satisfied | Satisfied | Satisfied | Satisfied | Satisfied | Satisfied | Satisfied | 1.56 | 8.2% | 1.61 |
| Example 3 | Satisfied | Satisfied | Satisfied | Satisfied | Satisfied | Satisfied | Satisfied | Satisfied | 2.02 | 9.8% | 1.60 |
| Comparative Example 1 | Unsatisfied | Satisfied | Satisfied | Satisfied | Satisfied | Satisfied | Satisfied | Satisfied | 1.88 | 28.2% | 1.48 |
| Comparative Example 2 | Satisfied | Satisfied | Satisfied | Satisfied | Satisfied | Satisfied | Satisfied | Satisfied | Unsatisfied | 23.8% | 1.59 |
| Comparative Example 3 | Satisfied | Satisfied | Satisfied | Satisfied | Satisfied | Satisfied | Satisfied | Satisfied | 2.85 (yellowed) | 12.1% | 1.51 |
| Comparative Example 4 | Satisfied | Satisfied | Satisfied | Satisfied | Satisfied | Satisfied | Satisfied | Satisfied | 2.70 (yellowed) | 14.6% | 1.51 |
| Comparative Example 5 | Satisfied | Satisfied | Satisfied | Satisfied | Satisfied | Satisfied | Satisfied | Satisfied | 2.66 | 18.1% | 1.51 |
| Comparative Example 6 | Unsatisfied | Satisfied | Satisfied | Satisfied | Satisfied | Unsatisfied | Satisfied | Unsatisfied | 2.98 | 9.2% | 1.59 |

In the Table 1, each measurement represents as follows:
1. Durability tests: impact resistance, moisture resistance, water resistance, thermal cycle, heat-resistance acid resistance, alkali resistance, and chemical resistance (gasoline, engine oil, glossy wax, grease, glass cleanser, or ethyl alcohol)
2. Weather resistance: accelerated weather resistance (2500 KJ/m$^2$)
3. Taber abrasion test: Satisfactory when Δ Haze = 10% ↓ [performed 500 times]
4. Refractive index: Was similar to refractive index [1.60] of PC material for plastic panorama loop, thereby enhancing transparency.

Experimental Examples

The durability, weather resistance, scratch resistance (abrasion resistance), and refractive index of each of the plastic glazings manufactured according to examples and comparative examples were measured.

To evaluate durability, impact resistance, moisture resistance, water resistance, thermal cycle, heat-resistance, acid resistance, alkali resistance, and chemical resistance were measured.

Impact resistance was evaluated using a weight drop impact testing machine defined by ISO 6272. When a coating film surface was not peeled upon impact application, it was evaluated to be satisfactory. When a coating film surface was peeled upon impact application, it was evaluated to be unsatisfactory.

Moisture resistance was evaluated under a condition of a test temperature of 50±2° C., a relative humidity of 95±2% RH, and a test time of 240 hr. When a surface of a coating film did not show discoloration, fading, swelling, cracks, gloss decrease, and the like, it was evaluated to be satisfactory. Otherwise, it was evaluated to be unsatisfactory.

Water resistance was evaluated under a condition of a test temperature of 40±2° C. and a test time of 240 hr. When a surface of a coating film did not show discoloration, fading, swelling, cracks, and gloss decrease, it was evaluated to be satisfactory. Otherwise, it was evaluated to be unsatisfactory.

Thermal cycle was performed in the following order: five cycles of 80±2° C.×3 h→1 h at room temperature →−40±2° swelling, cracks, and gloss decrease, it was evaluated to be satisfactory. Otherwise, it was evaluated to be unsatisfactory.

To evaluate acid resistance, 0.2 mL of 0.1 N hydrochloric acid was dropped onto a surface of a coating film and then the coating film was stood at room temperature for 24 hours. Subsequently, washing was performed and water was removed, followed by standing at room temperature for one hour. When the coating film surface did not show discoloration, fading, swelling, cracks, gloss decrease, and the like, it was evaluated to be satisfactory. Otherwise, it was evaluated to be unsatisfactory.

To evaluate alkali resistance, 0.2 mL of 0.1 N sodium hydroxide was dropped on a surface of a coating film, followed by standing at room temperature for 24 hours. Subsequently, washing was performed and water was removed, followed by standing at room temperature for one hour. When the coating film surface did not show discoloration, fading, swelling, cracks, gloss decrease, and the like, it was evaluated to be satisfactory. Otherwise, it was evaluated to be unsatisfactory.

To evaluate chemical resistance, a surface of a coating film was rubbed back and force with a force of 5 N 10 times using the defined chemical (e.g. gasoline, engine oil, glossy wax, grease, glass cleanser, ethyl alcohol). Subsequently, the surface was evaluated by observing with the naked eye. When the coating film surface did not show discoloration, fading, swelling, cracks, gloss decrease, and the like, it was evaluated to be satisfactory. Otherwise, it was evaluated to be unsatisfactory.

Weather resistance was evaluated according to a method defined by SAE J1960. In particular, accelerated weather resistance was evaluated at 2500 kJ/m$^2$ (340 nm). When a surface of a coating film did not show discoloration, fading, swelling, cracks, gloss decrease, and the like, it was evaluated to be satisfactory. Otherwise, it was evaluated to be unsatisfactory. In addition, yellowing was evaluated with the naked eye.

To evaluate scratch resistance (abrasion resistance), a Taber abrasion tester was used. When a test frequency was 500 times and a difference (A Haze) between an abrasion value and an abrasion amount was 10% or less, it was evaluated to be satisfactory.

Results of such property evaluations are summarized in Table 2 below.

than 70% by weight and the PDMS-PC resin in an amount of less than 20% by weight, thereby having decreased impact resistance and problems with regard to acid resistance and chemical resistance.

Accordingly, it can be confirmed that, when the resin composition included 60 to 70% by weight of the PMMA resin and 20 to 30% by weight of the PDMS-PC resin, durability was satisfied and superior weather resistance and abrasion resistance were exhibited.

The present invention includes the aforementioned configurations, thus having the following effects.

The resin composition for coating a plastic glazing according to the present invention may have substantially improved durability, i.e., excellent weather resistance,

TABLE 2

| | Evaluation results | | | | | | | | | |
|---|---|---|---|---|---|---|---|---|---|---|
| | Durability | | | | | | | | Weather resistance [ΔE: 3.0 ↓] | Taber abrasion test | Refractive index |
| Classification | Impact resistance | Moisture resistance | Water resistance | Thermal cycle | Heat resistance | Acid resistance | Alkali resistance | Chemical resistance | | | |
| Example 1 | Satisfied | Satisfied | Satisfied | Satisfied | Satisfied | Satisfied | Satisfied | Satisfied | 1.95 | 9.4% | 1.60 |
| Example 2 | Satisfied | Satisfied | Satisfied | Satisfied | Satisfied | Satisfied | Satisfied | Satisfied | 1.56 | 8.2% | 1.61 |
| Example 3 | Satisfied | Satisfied | Satisfied | Satisfied | Satisfied | Satisfied | Satisfied | Satisfied | 2.02 | 9.8% | 1.60 |
| Comparative Example 1 | Unsatisfied | Satisfied | Satisfied | Satisfied | Satisfied | Satisfied | Satisfied | Satisfied | 1.88 | 28.2% | 1.48 |
| Comparative Example 2 | Satisfied | Satisfied | Satisfied | Satisfied | Satisfied | Satisfied | Satisfied | Satisfied | Unsatisfied | 23.8% | 1.59 |
| Comparative Example 3 | Satisfied | Satisfied | Satisfied | Satisfied | Satisfied | Satisfied | Satisfied | Satisfied | 2.85 (yellowed) | 12.1% | 1.51 |
| Comparative Example 4 | Satisfied | Satisfied | Satisfied | Satisfied | Satisfied | Satisfied | Satisfied | Satisfied | 2.70 (yellowed) | 14.6% | 1.51 |
| Comparative Example 5 | Satisfied | Satisfied | Satisfied | Satisfied | Satisfied | Satisfied | Satisfied | Satisfied | 2.66 | 18.1% | 1.51 |
| Comparative Example 6 | Unsatisfied | Satisfied | Satisfied | Satisfied | Satisfied | Unsatisfied | Satisfied | Unsatisfied | 2.98 | 9.2% | 1.59 |

1. Durability tests: Impact resistance, moisture resistance, water resistance, thermal cycle, and heat-resistance acid resistance, alkali resistance, and chemical resistance (gasoline, engine oil, glossy wax, grease, glass cleanser, or ethyl alcohol)
2. Weather resistance: Accelerated weather resistance (2500 KJ/m$^2$)
3. Taber abrasion test: Was satisfied when Δ Haze = 10% ↓ [performed 500 times]
4. Refractive index: Was similar to refractive index [1.60] of PC material for plastic panorama loop, thereby enhancing transparency.

As shown in Table 2, it can be confirmed that Examples 1 to 3 had superior durability, weather resistance, and abrasion resistance. In addition, it can be confirmed that the refractive indexes of Examples 1 to 3 were 1.6 which was similar to the refractive index of the PC substrate and thus Examples 1 to 3 had high transparency.

On the other hand, it can be confirmed that, when Examples 1 to 3 and Comparative Example 1 were compared, Comparative Example 1 composed of only the PMMA resin had satisfactory weather resistance, but reduced impact resistance and abrasion resistance because it did not include the PDMS-PC resin.

In addition, it can be confirmed that, when Examples 1 to 3 and Comparative Example 2 were compared, Comparative Example 2 had poor weather resistance and abrasion resistance because it was composed of only the PDMS-PC resin.

In addition, it can be confirmed that, when Example 1, Comparative Example 3, Example 2, Comparative Example 4, Example 3, and Comparative Example 5 were compared, the comparative examples included the PMMA resin in an amount of less than 60% by weight and the PDMS-PC resin in an amount of greater than 30% by weight, thereby having reduced weather resistance and abrasion resistance.

Further, it can be confirmed that, when Example 2 and Comparative Example 6 were compared, Comparative Example 6 included the PMMA resin in an amount of greater scratch resistance, and the like, thereby being suitable for a glazing, for example, a panorama sunroof of a vehicle.

In addition, since the plastic glazing of the present invention is manufactured by integrally molding a substrate composed of the resin composition, polycarbonate and the like through double injection or double extrusion, a manufacturing process thereof may be simple and working time thereof may be reduced, compared to a conventional method. Thus, the manufacturing process of the present invention may provide improved productivity.

In addition, since the substrate according to the present invention may be manufactured using a conventional injection or extrusion device, a separate coating and drying devices may not be required.

That is, the method of manufacturing the plastic glazing according to the present invention may provide various advantages that may reduce production costs.

Effects of the present invention are not limited to the aforementioned effects. It should be understood that effects of the present invention include all effects which may be inferred from the following descriptions.

The invention has been described in detail with reference to various exemplary embodiments thereof. However, it will be appreciated by those skilled in the art that changes may be made in the embodiments without departing from the principles and spirit of the invention, the scope of which is defined in the appended claims and their equivalents.

What is claimed is:

1. A resin composition, comprising:
   an amount of about 60 to 70% by weight of polymethylmethacrylate resin,
   an amount of about 20 to 30% by weight of polycarbonate resin copolymerized with polydimethylsiloxane, and
   an amount of about 5 to 10% by weight of compatibilizer,
   all the % by weight based on the total weight of the resin composition.

2. The resin composition according to claim 1, wherein the polymethylmethacrylate resin has a refractive index of about 1.45 to 1.55 and a liquidity of about 5 to 7 g/10 min as being measured at a temperature of 230° C. and at a gravity force of 3.8 kgf.

3. The resin composition according to claim 1, wherein the polycarbonate resin copolymerized with polydimethylsiloxane has a refractive index of about 1.54 to 1.64 and a liquidity of about 6 to 10 g/10 min as being measured at a temperature of 300° C. and at a gravity force of 1.2 kgf.

4. The resin composition according to claim 1, wherein the compatibilizer is one or more selected from the group consisting of divinylbenzene, ethylene glycol dimethacrylate, and diethylene glycol dimethacrylate.

5. The resin composition according to claim 1, further comprising an amount of about 0.2 to 1.0 parts by weight of slip agent, based on 100 parts by weight of the resin composition, wherein the slip agent is at least one fatty acid amide selected from the group consisting of erucamide, behenamide, stearamide, oleamide, and palmitamide.

6. The resin composition according to claim 1, further comprising an amount of about 0.1 to 1.0 parts by weight of at least one UV stabilizer based on 100 parts by weight of the resin composition, wherein the UV stabilizer is selected from the group consisting of benzotriazole-based UV stabilizers, benzophenone-based UV stabilizers, hindered amine light stabilizers (HALSs), and triazine-based UV stabilizers.

7. The resin composition according to claim 1, further comprising at least one additive selected from a filler, a reinforcing agent, a coloring agent, a lubricant, a stabilizer, an antioxidant, and a heat-resistant agent.

8. The resin composition according to claim 1, consisting essentially of:
   an amount of about 60 to 70% by weight of polymethylmethacrylate resin,
   an amount of about 20 to 30% by weight of polycarbonate resin copolymerized with polydimethylsiloxane, and
   an amount of about 5 to 10% by weight of compatibilizer,
   all the % by weight based on the total weight of the resin composition.

9. A plastic glazing coated with the resin composition according to claim 1.

10. The plastic glazing according to claim 9, wherein the plastic glazing is a sunroof, a panorama sunroof, a rear glass, a front glass, or a quarter glass of a vehicle.

11. A vehicle comprising a plastic glazing according to claim 9.

12. A method of manufacturing a plastic glazing, comprising:
    integrally molding a plastic glazing by double-injecting or double-extruding a resin composition of claim 1 and polycarbonate glass.

13. The method according to claim 12, wherein the double injecting or the double extruding is performed at a molding temperature of about 190 to 220° C. for a molding time of about 100 to 200 sec.

14. The method according to claim 12, wherein the plastic glazing is a sunroof, a panorama sunroof, a rear glass, a front glass, or a quarter glass of a vehicle.

15. A vehicle comprising a resin composition of claim 1.

* * * * *